H. M. PAINE.

ELECTROMAGNETIC COIL.

No. 4,237. Reissued Jan. 24, 1871

Henry M. Paine

Witnesses:

Jas Stanbaugh

H. M. Pierson

UNITED STATES PATENT OFFICE.

HENRY M. PAINE, OF NEWARK, NEW JERSEY, ASSIGNOR, BY MESNE ASSIGNMENTS, TO THE PAINE ELECTRO-MAGNETIC ENGINE COMPANY.

IMPROVEMENT IN THE CONSTRUCTION OF ELECTRO-MAGNETS.

Specification forming part of Letters Patent No. 103,231, dated May 17, 1870; Reissue No. 4,237, dated January 24, 1871.

*To all whom it may concern:*

Be it known that I, HENRY M. PAINE, of the city of Newark, in the county of Essex and State of New Jersey, have invented a new and useful Improvement in Electro-Magnets, of which the following is a specification.

The object of my invention is to increase the power of electro-magnets by neutralizing the induced currents, and thus rendering available the full dynamic value of the battery; and to this end my improvement consists in the interposition between the layers of coils or the application, as a clothing or covering to the insulated wires of which the coils are composed, of a metallic medium, by which the antagonism of like currents to each other is neutralized. The metallic medium which may be employed may be of various kinds, but that which I generally propose to use as most convenient for the purpose is what is known as "metal foil." The medium may be applied in various ways; but for illustration I have shown in the accompanying drawings two ways of applying it.

Figure 1:
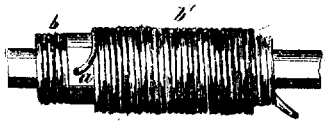

In Figure 1 metal foil *a*, in the form of a sheet or ribbon, is shown wound or lapped around and between the successive layers of coils *b b'* of insulated wire.

Figure 2:
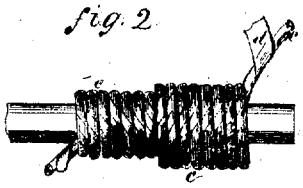

In Fig. 2 the entire length of the insulated wire is shown as having a ribbon, *d*, of metal foil wound around it, to form a complete clothing or covering.

What I claim as my invention, and desire to secure by Letters Patent, is—

The interposition of a metallic medium between the layers of the coils of an electro-magnet, or the application of a metallic medium as a clothing or covering to the wire of an electro-magnet, as and for the purpose herein specified.

HENRY M. PAINE.

Witnesses:

JAS. STANBROUGH,

H. M. PIERSON.